United States Patent
Ng et al.

(10) Patent No.: US 11,211,819 B2
(45) Date of Patent: Dec. 28, 2021

(54) CHARGING DEVICE THAT FOCUSES FLUX BY FLOWING CURRENT THROUGH SPIRALS IN OPPOSING RADIAL DIRECTIONS

(71) Applicant: Microsoft Technology Licensing, LLC, Redmond, WA (US)

(72) Inventors: Shiu Sang Ng, Kirkland, WA (US); Timothy A. Jakoboski, Woodinville, WA (US); Peter Kyriacou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 15/939,228

(22) Filed: Mar. 28, 2018

(65) Prior Publication Data
US 2019/0305591 A1  Oct. 3, 2019

(51) Int. Cl.
| | |
|---|---|
| *H02J 50/40* | (2016.01) |
| *H02J 50/10* | (2016.01) |
| *H01F 27/28* | (2006.01) |
| *H02J 7/02* | (2016.01) |
| *H01F 27/38* | (2006.01) |
| *H01F 38/14* | (2006.01) |
| *H02J 50/12* | (2016.01) |
| *H02J 50/70* | (2016.01) |
| *H01F 27/36* | (2006.01) |

(52) U.S. Cl.
CPC ............. *H02J 50/10* (2016.02); *H01F 27/28* (2013.01); *H01F 27/38* (2013.01); *H01F 38/14* (2013.01); *H02J 7/025* (2013.01); *H02J 50/12* (2016.02); *H02J 50/40* (2016.02); *H02J 50/402* (2020.01); *H02J 50/70* (2016.02); *H01F 27/36* (2013.01)

(58) Field of Classification Search
CPC .. H02J 50/10; H02J 50/12; H02J 50/40; H02J 50/70; H02J 7/025; H02J 50/00; H02J 50/001; H02J 50/402; H01F 27/28; H01F 27/38; H01F 38/14
See application file for complete search history.

(56) References Cited

U.S. PATENT DOCUMENTS

| | | |
|---|---|---|
| 9,112,363 B2 | 8/2015 | Partovi |
| 9,142,999 B2 | 9/2015 | Von Novak |
| 9,419,465 B2 | 8/2016 | van Lammeren et al. |
| 9,537,337 B2 | 1/2017 | Madau et al. |

(Continued)

OTHER PUBLICATIONS

Gil, Lory, "Apple is building its own branded wireless charger for iPhone, Apple Watch, and AirPods!", Retrieved From <<https://www.imore.com/airpower-everything-you-need-know>>, Sep. 12, 2017, 5 Pages.

(Continued)

*Primary Examiner* — Richard Isla
*Assistant Examiner* — Johali A Torres Ruiz
(74) *Attorney, Agent, or Firm* — Wade IP Law PLLC

(57) ABSTRACT

Charging devices described herein include at least one coil having spirals through which current flows in opposing radial directions to focus flux. For instance, the flux for a coil may be focused in a shape of a toroid having first and second cross-sections that intersect the respective spirals of the coil at a plane in which the spirals are defined. Focusing the flux in this manner may facilitate wireless power transfer from the coil(s) to a chargeable wireless device.

22 Claims, 5 Drawing Sheets

(56) References Cited

U.S. PATENT DOCUMENTS

| | | | |
|---|---|---|---|
| 9,614,396 B1 | 4/2017 | Bait-Suwailam et al. | |
| 2007/0182367 A1 | 8/2007 | Partovi | |
| 2009/0096413 A1 | 4/2009 | Partovi et al. | |
| 2011/0031928 A1* | 2/2011 | Soar | H04B 5/0031 320/108 |
| 2013/0020988 A1 | 1/2013 | Kim et al. | |
| 2013/0119928 A1* | 5/2013 | Partovi | B60L 53/124 320/108 |
| 2013/0200721 A1* | 8/2013 | Kurs | H02J 50/20 307/104 |
| 2014/0075075 A1* | 3/2014 | Morrill | G06F 1/1632 710/303 |
| 2014/0306654 A1* | 10/2014 | Partovi | H02J 50/12 320/108 |
| 2015/0214752 A1* | 7/2015 | Gluzman | H02J 50/40 307/104 |
| 2015/0244175 A1* | 8/2015 | Abe | H02J 7/0042 307/104 |
| 2016/0013661 A1 | 1/2016 | Kurs et al. | |
| 2016/0181857 A1 | 6/2016 | Konanur et al. | |
| 2016/0285317 A1* | 9/2016 | Maniktala | H02J 50/70 |
| 2017/0005399 A1* | 1/2017 | Ito | H02J 50/70 |
| 2017/0248999 A1 | 8/2017 | Ng et al. | |
| 2017/0264130 A1 | 9/2017 | Lethellier | |
| 2017/0302097 A1 | 10/2017 | Kim et al. | |
| 2018/0198209 A1* | 7/2018 | Kang | H04B 5/0056 |
| 2018/0198322 A1* | 7/2018 | Mercier | H02J 50/402 |
| 2018/0263557 A1* | 9/2018 | Kahlman | H02J 50/40 |
| 2018/0278099 A1* | 9/2018 | Hong | H04B 5/0037 |
| 2018/0351414 A1* | 12/2018 | Park | H01F 27/2804 |
| 2019/0097459 A1* | 3/2019 | Ettes | H04B 5/0031 |
| 2019/0356175 A1* | 11/2019 | Jo | H02J 50/402 |

OTHER PUBLICATIONS

"International Search Report and Written Opinion Issued in PCT Application No. PCT/US2019/023491", dated May 13, 2019, 11 Pages.

* cited by examiner

CHARGING DEVICE THAT FOCUSES FLUX BY FLOWING CURRENT THROUGH SPIRALS IN OPPOSING RADIAL DIRECTIONS

BACKGROUND

With the increased popularity of wireless devices in modern society, it has become relatively common for a user to own or possess multiple wireless devices. The user may have multiple charging systems that are configured to charge the various wireless devices. For instance, some wireless devices have proprietary charging systems that are configured to charge only a specific brand of wireless devices. Wireless accessories, such as mice, earbuds, and styluses, often have charging systems that are specific to those accessories. The Qi® standard, which is published by the Wireless Power Consortium, is an open interface standard that was developed to provide universal charging for wireless devices that utilize Qi® technology. However, the Qi® technology utilizes a coil that is too large to place in some wireless devices, including many wireless accessories.

SUMMARY

Various charging devices are described herein that include at least one coil having spirals through which current flows in opposing radial directions to focus flux. For instance, the flux for a coil may be focused in a shape of a toroid having first and second cross-sections that intersect the respective spirals of the coil at a plane in which the spirals are defined. Focusing the flux in this manner may facilitate wireless power transfer from the coil(s) to a chargeable wireless device.

A first example charging device includes a first charging coil, a second charging coil, and a controller. The first charging coil is configured to wirelessly transfer power to a first type of wireless device using near-field inductive coupling via a first magnetic field that oscillates at a first frequency. The second charging coil is configured to wirelessly transfer power to a second type of wireless device using near-field inductive coupling via a second magnetic field that oscillates at a second frequency that is greater than the first frequency. The second charging coil includes a first spiral and a second spiral that are defined in a common plane. The controller is configured to determine whether a chargeable wireless device is of the first type or the second type. The controller is configured to cause the first charging coil to wirelessly transfer power to the chargeable wireless device in response to the chargeable wireless device being of the first type. The controller is configured to cause the second charging coil to wirelessly transfer power to the chargeable wireless device by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane in response to the chargeable wireless device being of the second type.

A second example charging device includes a first charging coil, a second charging coil, and a controller. The first charging coil is configured to wirelessly transfer power to a Qi-enabled device using near-field inductive coupling in accordance with a Qi® open interface standard via a first magnetic field that oscillates at a first frequency in a range between 100 kilohertz (kHz) and 310 kHz. The second charging coil is configured to wirelessly transfer power to a near-field-communication-enabled device using near-field inductive coupling via a second magnetic field that oscillates at a second frequency of approximately 13.6 megahertz (MHz). The second charging coil includes a first spiral and a second spiral that are defined in a common plane. The controller is configured to determine whether a specified chargeable wireless device is a Qi-enabled device corresponding to the first charging coil or a near-field-communication-enabled device corresponding to the second charging coil. The controller is configured to cause the first charging coil to wirelessly transfer power to the specified chargeable wireless device in response to the specified chargeable wireless device being a Qi-enabled device corresponding to the first charging coil. The controller is configured to cause the second charging coil to wirelessly transfer power to the specified chargeable wireless device by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane in response to the specified chargeable wireless device being a near-field-communication-enabled device corresponding to the second charging coil.

In an example method of charging a chargeable wireless device, first and second operations are alternately performed. In the first operation, a first ping signal having a first frequency is communicated via a first charging coil. In the second operation, a second ping signal having a second frequency that is greater than the first frequency is communicated via a second charging coil that includes a first spiral and a second spiral that are defined in a common plane. A response signal is received from a chargeable wireless device (e.g., in response to alternately performing the first and second operations). A determination is made that the response signal is a response to the second ping signal. Power is wirelessly transferred from the second charging coil to the chargeable wireless device using near-field inductive coupling via a magnetic field that oscillates at the second frequency based at least in part on a determination that the response signal is the response to the second ping signal. Wirelessly transferring the power may comprise generating the magnetic field via which the power is wirelessly transferred by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the disclosed technologies are not limited to the specific implementations described in the Detailed Description and/or other sections of this document. Such implementations are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate implementations of the disclosed technologies and, together with the description, further serve to explain the principles involved and to enable a person skilled in the relevant art(s) to make and use the disclosed technologies.

Figure 1:
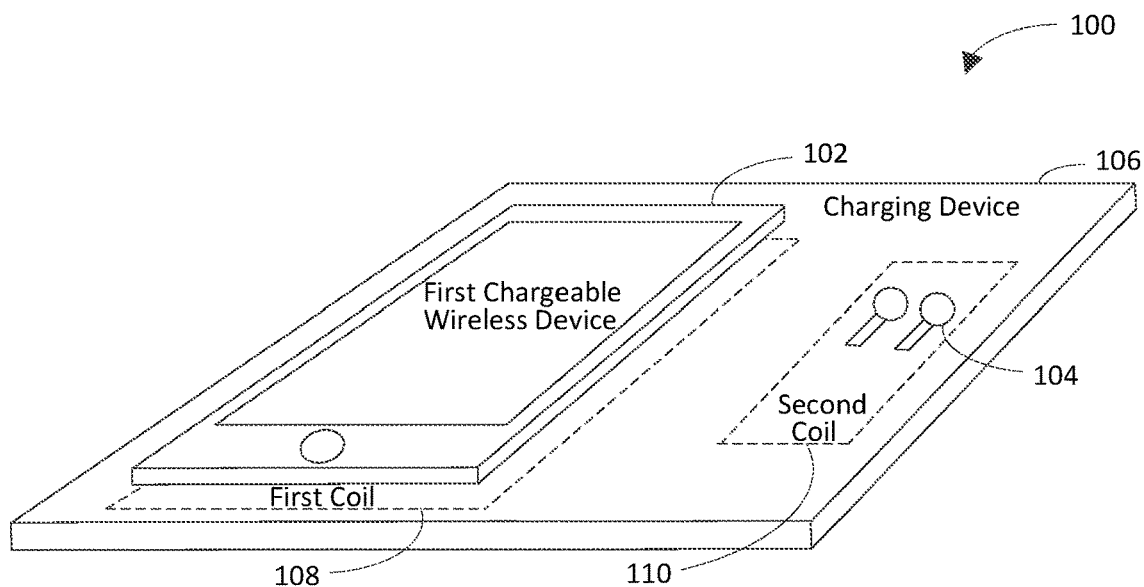
FIG. 1 is a perspective view of an example multi-frequency charging system.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate examples and implementations of the disclosed technologies. However, the scope of the present disclosure is not limited to these examples and implementations, but is instead defined by the appended claims. Thus, examples and implementations beyond those shown in the accompanying drawings, such as modified versions of the illustrated examples and implementations, may nevertheless be encompassed by the present disclosure.

References in the specification to "one implementation," "an implementation," "an example implementation," or the like, indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the relevant art(s) to implement such feature, structure, or characteristic in connection with other implementations whether or not explicitly described.

II. Example Implementations

Example charging devices described herein include at least one coil having spirals through which current flows in opposing radial directions to focus flux. For instance, the flux for a coil may be focused in a shape of a toroid having first and second cross-sections that intersect the respective spirals of the coil at a plane in which the spirals are defined. Focusing the flux in this manner may facilitate wireless power transfer from the coil(s) to a chargeable wireless device.

Example techniques described herein have a variety of benefits as compared to conventional techniques for wirelessly charging wireless device(s). For instance, the example techniques may be capable of wirelessly transferring power to devices that are too small to include a specified coil (e.g., a Qi® coil). The example techniques also may be capable of wirelessly transferring power to devices that are big enough to include the specified coil. For example, a charging device may include a first coil that is configured to wirelessly transfer power to chargeable wireless devices (e.g., personal digital assistants, cellular telephones, tablet computers, laptop computers, and displays) that include the specified coil and a second coil having spirals through which current flows in opposing radial directions to wirelessly transfer power to chargeable wireless devices (e.g., wireless accessories, such as mice, earbuds, and styluses) that are too small to include the specified coil. Regardless whether the charging device includes other coil(s) in addition to the second coil, the flow of the current through the spirals of the second coil in the opposing radial directions may focus the resulting flux into a shape of a toroid. The toroid includes a toroid tube around a hole, which has a perimeter defined in a plane that is perpendicular to a plane in which the current flows through the first and second spirals. Focusing the flux in this manner may substantially reduce (e.g., eliminate) eddy current loss created by the flux fringe effect and therefore may increase an efficiency of the wireless power transfer from the coil to a chargeable wireless device and/or may decrease an amount of time that is consumed to wirelessly transfer the power from the coil to the chargeable wireless device.

The example techniques may improve a user experience associated with charging one or more chargeable wireless devices. For instance, the example techniques may be capable of charging chargeable wireless devices that are associated with different charging standards. For example, a charging device may include a first coil that is configured to wirelessly transfer power in accordance with the Qi® open interface standard and a second coil, including spirals through which current flows in opposing radial directions, that is configured to wirelessly transfer power in accordance with a near-field communication (NFC) standard. The charging device may include a third coil that is configured to wirelessly transfer power in accordance with a third standard (e.g., an AirFuel™ standard), a fourth coil that is configured to wirelessly transfer power in accordance with a fourth standard, and so on. Each coil may be configured to wirelessly transfer power in accordance with a single standard or multiple standards. For instance, in the example mentioned above, the first coil may be configured to wirelessly transfer power in accordance with the Qi® open interface standard and the AirFuel™ standard. Each of the coils may be configured to wirelessly transfer power in accordance with any suitable standard(s). For instance, in the example mentioned above, the first coil may be configured to wirelessly transfer power in accordance with the AirFuel™ standard, rather than the Qi® open interface standard.

The example techniques may reduce an amount of time and/or resources (e.g., power, charging circuitry, frequency spectrum) that are consumed to charge chargeable wireless device(s). The example techniques may increase efficiency of the charging device that is used to wirelessly transfer the power to the chargeable wireless device(s). The example techniques may increase user efficiency (e.g., by reducing a number of steps that a user takes to charge a chargeable wireless device). For instance, the example techniques may reduce (e.g., eliminate) at least some of the steps that a user would typically perform to charge chargeable wireless device(s). For example, the user need not necessarily search for a brand-specific or device-specific charging device in order to charge a chargeable wireless device. In another example, the user need not necessarily gather multiple charging devices to charge corresponding chargeable wireless devices.

FIG. 1 is a perspective view of an example multi-frequency charging system 100. Generally, multi-frequency charging system 100 utilizes multiple inductor coil pairs for charging respective types of wireless devices.

As shown in FIG. 1, the multi-frequency charging system 100 includes a first chargeable wireless device 102, a second chargeable wireless device 104, and a charging device 106. Communication between the first chargeable wireless device 102 and the charging device 106 and/or between the second chargeable wireless device 104 and the charging device 106 may be performed in accordance with any suitable communication protocol. For example, the first chargeable wireless device 102 and the charging device 106 may be configured to communicate in accordance with a Qi® protocol. In another example, the second chargeable wireless device 104 and the charging device 106 may be configured to communicate in accordance with a near-field communication protocol. The first chargeable wireless device 102 and the second chargeable wireless device 104 may be synced such that communication between the first chargeable wireless device 102 and the second chargeable wireless device 104 may be carried out over a network, such as a Bluetooth® network. It will be recognized that the first chargeable wireless device 102 and the second chargeable wireless device 104 need not necessarily be synced.

The charging device 106 is configured to wirelessly transfer power to chargeable wireless devices. The charging device 106 includes a first coil 108 and a second coil 110. The first coil 108 is configured to wirelessly transfer power to a first type of wireless device (e.g., the first chargeable wireless device 102) using near-field inductive coupling via a first magnetic field that oscillates at a first frequency. The first frequency (or a range of frequencies that includes the first frequency) may be specified by a first communication standard (e.g., the Qi® standard), though the scope of the example implementations is not limited in this respect. The second coil 110 is configured to wirelessly transfer power to a second type of wireless device (e.g., the second chargeable wireless device 104) using near-field inductive coupling via a second magnetic field that oscillates at a second frequency that is greater than the first frequency. The second frequency (or a range of frequencies that includes the second frequency) may be specified by a second communication standard (e.g., a near-field communication standard), though the scope of the example implementations is not limited in this respect. The second coil 110 includes spirals through which current flows in opposing radial directions to focus the resulting flux (e.g., in a shape of a toroid having cross-sections that intersect the respective spirals at respective right angles at a plane in which the spirals are formed) to facilitate wireless transfer of power to the second type of wireless device. Example implementations of the second coil 110 and corresponding functionality are discussed below with reference to FIGS. 2-9.

Each of the first chargeable wireless device 102 and the second chargeable wireless device 104 is a processing system that is capable of wirelessly receiving power from the charging device 106. An example of a processing system is a system that includes at least one processor that is capable of manipulating data in accordance with a set of instructions. For instance, a processing system may be a personal digital assistant, a cellular telephone, a wireless accessory (e.g., headphones, a mouse, earbuds, an electronic pen, or a display), or a computer (e.g., a tablet computer; a laptop computer; or a wearable computer, such as a smart watch or a head-mounted computer). Each of the first chargeable wireless device 102 and the second chargeable wireless device 104 is described as being a processing system for non-limiting, illustrative purposes. It will be recognized that the first chargeable wireless device 102 and the second chargeable wireless device 104 need not necessarily be processing system, so long as the first chargeable wireless device 102 and the second chargeable wireless device 104 are wireless devices that are capable of being wirelessly charged.

The first chargeable wireless device 102 is configured to wirelessly receive power from the first coil 108 of the charging device 106. For instance, the first chargeable wireless device 102 may include a designated coil that oscillates at the same frequency as the first coil 108 to facilitate the wireless transfer of power from the first coil 108 to the designated coil.

The second chargeable wireless device is configured to wirelessly receive power from the second coil 110 of the charging device 106. For instance, the second chargeable wireless device 104 may include a specified coil that oscillates at the same frequency as the second coil 110 to facilitate the wireless transfer of power from the second coil 110 to the specified coil.

The multi-frequency charging system 100 is described above as utilizing multiple inductor coil pairs for charging respective types of wireless devices for non-limiting, illustrative purposes. It will be recognized that multi-frequency charging system 100 may utilizes any suitable number of inductor coil pairs (e.g., a single inductor coil pair) for charging any suitable number of wireless device types (e.g., a single type of wireless device). For instance, the multi-frequency charging system 100 need not necessarily include the first chargeable wireless device 102 and the first coil 108.

Figure 2:
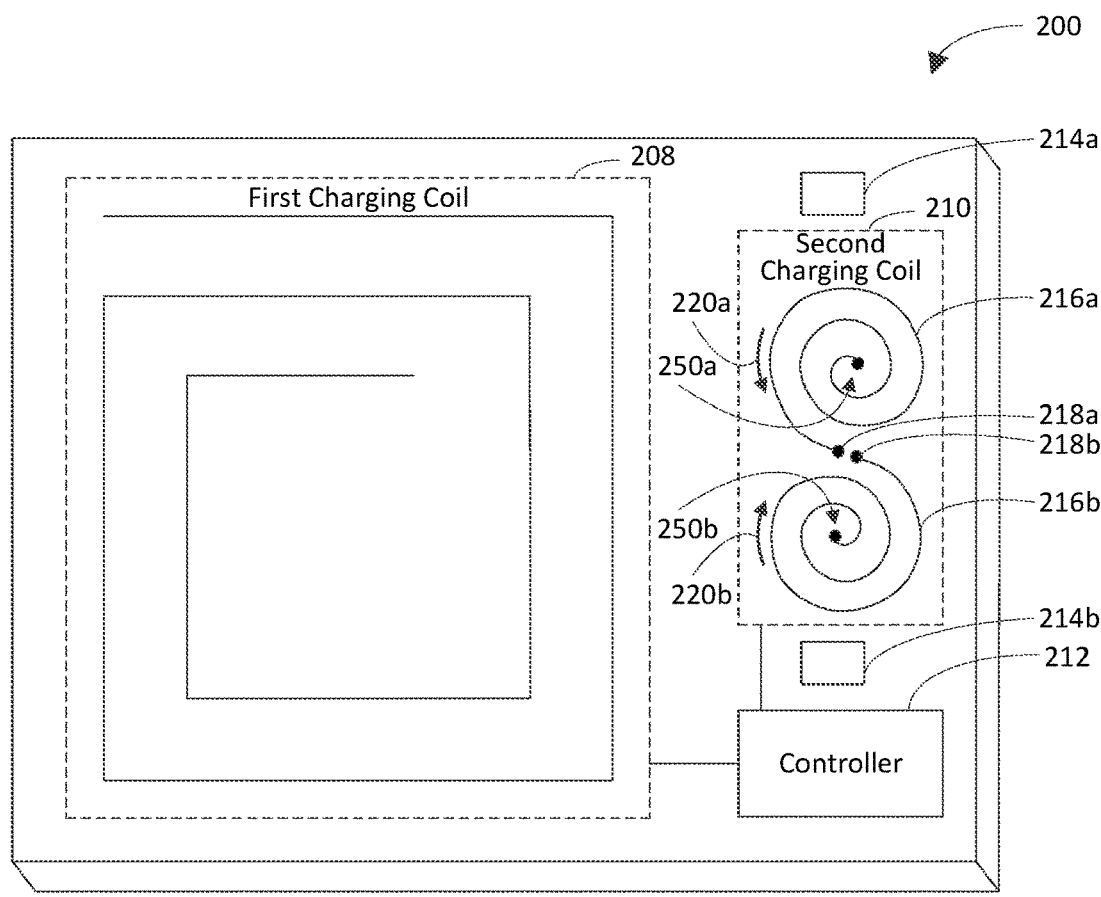
FIGS. 2 and 3 are bock diagrams of example implementations of a charging device shown in FIG. 1.

FIG. 2 is a block diagram of an example charging device 200. The charging device 200 is an example implementation of a charging device 106 shown in FIG. 1. The charging device 200 includes a first charging coil 208, a second charging coil 210, a first magnet 214a, and a second magnet 214b. The first charging coil 208 is configured to wirelessly transfer power to a first type of wireless device using near-field inductive coupling via a first magnetic field that oscillates at a first frequency. For instance, current flowing through the first charging coil 208 may generate the first magnetic field to enable the near-field inductive coupling. The first frequency may be less than or equal to a threshold frequency. For instance, the threshold frequency may be 1 MHz, 500 kHz, or 310 kHz. The first frequency may be in a designated range. For example, the designated range may be between 100 kHz and 310 kHz. In another example, the designated range may be between 110 kHz and 300 kHz. The first charging coil 208 may be configured to wirelessly transfer power of greater than or equal to a threshold power to the first type of wireless device. For instance, the threshold power may be 0.3 watts (W), 0.5 W, 1 W, 2 W, 5 W, 10 W, or 15 W.

In an example implementation, the first charging coil 208 includes a single spiral having a radius that increases in a single angular direction. In accordance with this implementation, the first charging coil 208 does not include stacked spirals (e.g., spirals defined in different planes). In yet another example implementation, the first charging coil 208 includes stacked coils. For example, the stacked coils may be defined in respective planes that are parallel to one another. In accordance with this example, the first charging coil 208 is deemed to be defined in any one or more of the planes in which the respective stacked coils are defined. In further accordance with this example, the stacked coils may have respective origins at respective points along a common axis that is perpendicular to the respective planes in which the respective stacked coils are defined. Regardless whether the first charging coil 208 includes a single spiral or stacked spirals, the first charging coil 208 may be essentially flat. For instance, the first charging coil 208 may have a thickness that is less than or equal to a threshold thickness. The thickness of the first charging coil 208 is defined along an axis that is perpendicular to a plane in which the first charging coil 208 is defined.

The second charging coil 210 is configured to wirelessly transfer power to a second type of wireless device using near-field inductive coupling via a second magnetic field that oscillates at a second frequency that is greater than the first frequency. For instance, current flowing through the second charging coil 210 may generate the second magnetic field to enable the near-field inductive coupling. The second frequency may be greater than or equal to a threshold frequency. For instance, the threshold frequency may be 1 MHz, 5 MHz, or 10 MHz. The second frequency may be approximately 13.6 MHz or approximately 13.56 MHz. The second frequency may be in a specified range. For example, the specified range may be between 12 MHz and 15 MHz. In another example, the specified range may be between 13 MHz and 14 MHz. The second charging coil 210 may be configured to wirelessly transfer power of less than or equal to a threshold power to the second type of wireless device. The threshold power may be 0.3 W, 0.5 W, 1 W, or 2 W. The second charging coil 210 may be essentially flat, though the scope of the example embodiments is not limited in this respect.

The second charging coil 210 includes a first spiral 216a and a second spiral 216b. The first and second spirals 216a-216b are defined in a common plane. In an example implementation, the first spiral 216a includes a single spiral, and the second spiral 216b includes a single spiral. In accordance with this implementation, the first and second spirals 216a-216b do not include stacked spirals. In yet another example implementation, the first spiral 216a includes first stacked spirals, and the second spiral 216b includes second stacked spirals. For example, the first stacked spirals may be defined in respective planes that are parallel to one another, and the second stacked spirals may be defined in respective planes that are parallel to one another. In accordance with this example, the first spiral 216a is deemed to be defined in any one or more of the planes in which the respective first stacked coils are defined, and the second spiral 216b is deemed to be defined in any one or more of the planes in which the respective second stacked coils are defined. In further accordance with this example, the first stacked coils may have respective origins at respective points along a first common axis that is perpendicular to the respective planes in which the respective first stacked coils are defined, and the second stacked coils may have respective origins at respective points along a second common axis that is perpendicular to the respective planes in which the respective second stacked coils are defined. Regardless whether each of the first and second spirals 216a-216b includes a single spiral or stacked spirals, each of the first and second spirals 216a-216b may be essentially flat. For instance, the first and second spirals 216a-216b may have respective thicknesses that are less than or equal to a threshold thickness. The thicknesses of the respective first and second spirals 216a-216b are defined along respective axes that are perpendicular to respective planes in which the respective first and second spirals 216a-216b are defined.

The first spiral 216a and the second spiral 216b are connected such that when a current flows through the first and second spirals 216a-216b, the current flows in a first radial direction through the first spiral 216a and in a second radial direction that is opposite the first radial direction through the second spiral 216b. For example, the current may flow counterclockwise through the first spiral 216a and clockwise through the second spiral 216b. In another example, the current may flow clockwise through the first spiral 216a and counterclockwise through the second spiral 216b.

The first spiral 216a is shown in FIG. 2 to have a first inner connection point 250a and a first outer connection point 218a for non-limiting, illustrative purposes. The second spiral 216b is shown in FIG. 2 to have a second inner connection point 250b and a second outer connection point 218b for non-limiting, illustrative purposes. In a first example implementation, the first and second spirals 216a-216b are connected based on the first inner connection point 250a of the first spiral 216a and the second inner connection point 250b of the second spiral 216b being connected. In a second example implementation, the first and second spirals 216a-216b are connected based on the first outer connection point 218a of the first spiral 216a and the second outer connection point 218b of the second spiral 216b being connected. It will be recognized that the first and second spirals 216a-216b may be connected in any suitable configuration, so long as the connection causes the current to flow in a first radial direction through the first spiral 216a and in a second radial direction that is opposite the first radial direction through the second spiral 216b.

The first and second spirals 216a-216b are shown in FIG. 2 to have respective radii that increase in a common radial direction (e.g., counterclockwise in this example) for non-limiting, illustrative purposes. Depending on how the first and second spirals 216a-216b are connected, the radii may increase in opposing radial directions in some implementations, so long as the current flows through the first and second spirals 216a-216b in opposing radial directions. The first and second spirals 216a-216b are shown to be connected in FIG. 2 for illustrative purposes and are not intended to be limiting. Persons skilled in the relevant art will recognize that the first and second spirals 216a-216b need not be connected. If the first and second spirals 216a-216b are not connected, the first and second spirals 216a-216b may have respective radii that increase in a common radial direction or in opposing radial directions, so long as the current in the first spiral 216a and the current in the second spiral 216b flow in opposite radial directions.

The first and second magnets 214a-214b are configured to align an orientation and a position of a specified chargeable wireless device of the second type with the second charging coil 210. For instance, the first and second magnets 214a-214b may change a relative orientation of the specified chargeable wireless device with reference to the charging device 200 using a magnetic force such that the second charging coil 210 becomes aligned with a corresponding coil of the specified chargeable wireless device. The first and second magnets 214a-214b may be configured to releasably couple to the specified chargeable wireless device. For example, the first and second magnets 214a-214b may be configured to releasably hold the specified chargeable wireless device in physical contact with the charging device 200 so that the alignment is maintained while the second charging coil 210 wirelessly transfers power to the specified chargeable wireless device.

The first and second magnets 214-216b constitute one example type of alignment structure and are not intended to be limiting. It will be recognized that the charging device 200 may include any suitable type of alignment structure or no alignment structure at all. Other example types of an alignment structure include but are not limited to a mechanical fastener and a mechanical trough.

In one example implementation, the charging device 200 includes a mechanical fastener configured to mechanically and releasably attach the charging device 200 to a specified chargeable wireless device of the second type such that alignment of the second charging coil 210 with a corresponding coil of the specified chargeable wireless device is maintained while the second charging coil 210 wirelessly transfers power to the specified chargeable wireless device. For instance, the mechanical fastener may include a clamp, a snap, a clasp, and/or a loop (e.g., plastic loop) that is configured to releasably couple to the specified chargeable wireless device and/or releasably hold the specified chargeable wireless device in physical contact with the charging device 200 so that the alignment is maintained.

In another example implementation, the charging device 200 includes a mechanical trough configured to physically align a specified chargeable wireless device of the second type with the second charging coil 210. The mechanical trough may be a depression in a surface of the charging device 200 that hinders movement of the specified chargeable wireless device when the specified chargeable wireless device is placed in the mechanical trough. A perimeter of the depression may overlap with a perimeter of the second charging coil 210. For instance, the depression in the surface may be located directly above the second charging coil 210.

In some example implementations, the charging device 200 includes an alignment structure configured to maintain alignment of a specified chargeable wireless device of the second type with the second charging coil 210 within a threshold distance in all directions in three-dimensional space while the second charging coil 210 wirelessly transfers power to the specified chargeable wireless device. The threshold distance may be 0.6 millimeters (mm), 0.8 mm, 1.0 mm, 1.2 mm, or any other suitable distance. If the threshold distance is 0.6 mm, the accuracy of the alignment is said to be 0.6 mm; if the threshold distance is 0.8 mm, the accuracy of the alignment is said to be 0.8 mm, and so on.

The controller 212 is configured to determine whether a chargeable wireless device is of the first type or the second type. The controller 212 may make the determination based on (e.g., based at least in part on) a signal that is received from the chargeable wireless device. For example, the signal having a first designated attribute may indicate that the chargeable wireless device is of the first type. The signal having a second designated attribute may indicate that the chargeable wireless device is of the second type. The first and second designated attributes may include respective frequencies, respective amplitudes, respective phases, respective duty cycles, and/or respective data that may be encoded into the signal. The controller 212 is configured to cause the first charging coil 208 to wirelessly transfer power to the chargeable wireless device in response to the chargeable wireless device being of the first type. The controller 212 is configured to cause the second charging coil to wirelessly transfer power to the chargeable wireless device. For instance, the controller 212 may simultaneously cause a first current to flow through the first spiral 216a in a first radial direction (indicated by arrow 220a) and a second current to flow through the second spiral 216b in a second radial direction (indicated by arrow 220b) that is opposite the first radial direction to focus flux that is generated by the first current and the second current in a shape of a toroid in response to a determination that the chargeable wireless device is of the second type. The toroid has first and second cross-sections that intersect (e.g., coincide with) the respective first and second spirals 216a-216b at the common plane in which the first and second spirals 216a-216b are defined.

The first charging coil 208 and the second charging coil 210 are shown in FIG. 2 to be non-overlapping (e.g., adjacent) for illustrative purposes and are not intended to be limiting. The first charging coil 208 and the second charging coil 210 being configured to not overlap may enable multiple chargeable wireless devices (chargeable wireless devices 102 and 104) to be charged simultaneously. For instance, the controller 212 may be configured to cause the first charging coil 208 and the second charging coil 210 to wirelessly transfer power to respective first and second chargeable wireless devices simultaneously. It will be recognized that the first coil 208 and the second coil 210 may at least partially overlap in some implementations.

The charging device 200 may be incorporated into another electrical component. In an example implementation, the charging device 200 is incorporated into a power adapter of a computer. In accordance with this implementation, each of the first charging coil 308 and the second charging coil 310 is planar, meaning that the second charging coil 310 is defined in the common plane in which the first and second spirals 316a-316b are defined. The first charging coil 308 may be defined in the common plane, as well, or in a different plane. For instance, the first charging coil 308 may be defined in a plane that is perpendicular to the common plane.

In an example implementation, the first charging coil 208 is configured to wirelessly transfer power to a Qi-enabled device using near-field inductive coupling in accordance with a Qi open interface standard via the first magnetic field. For instance, the first frequency may be in a range between 100 kHz and 310 kHz. In accordance with this implementation, the second charging coil 210 is configured to wirelessly transfer power to a near-field-communication-enabled device using near-field inductive coupling via the second magnetic field. For instance, the second frequency may be approximately 13.6 MHz. In further accordance with this implementation, the controller 212 is configured to determine whether the chargeable wireless device is a Qi-enabled device corresponding to the first charging coil 208 or a near-field-communication-enabled device corresponding to the second charging coil 210. In further accordance with this implementation, the controller 212 is configured to cause the first charging coil 208 to wirelessly transfer power to the chargeable wireless device in response to the chargeable wireless device being a Qi-enabled device corresponding to the first charging coil 208. In further accordance with this implementation, the controller 212 is configured to cause the second charging coil 210 to wirelessly transfer power to the chargeable wireless device in response to the chargeable wireless device being a near-field-communication-enabled device corresponding to the second charging coil 210.

It will be recognized that the charging device 200 may not include any one or more of the components shown in FIG. 2. For example, the charging device 200 may include the second charging coil 210 and not the first charging coil 208. In accordance with this example, the charging device 200 may not include the controller 212. Furthermore, the charging device 200 may include component(s) in addition to or in lieu of any one or more of the components shown in FIG. 2. For instance, the charging device 200 may include multiple second charging coils, such that each second charging coil includes a respective first spiral and a respective second spiral through which currents flow in opposing radial directions.

Figure 3:
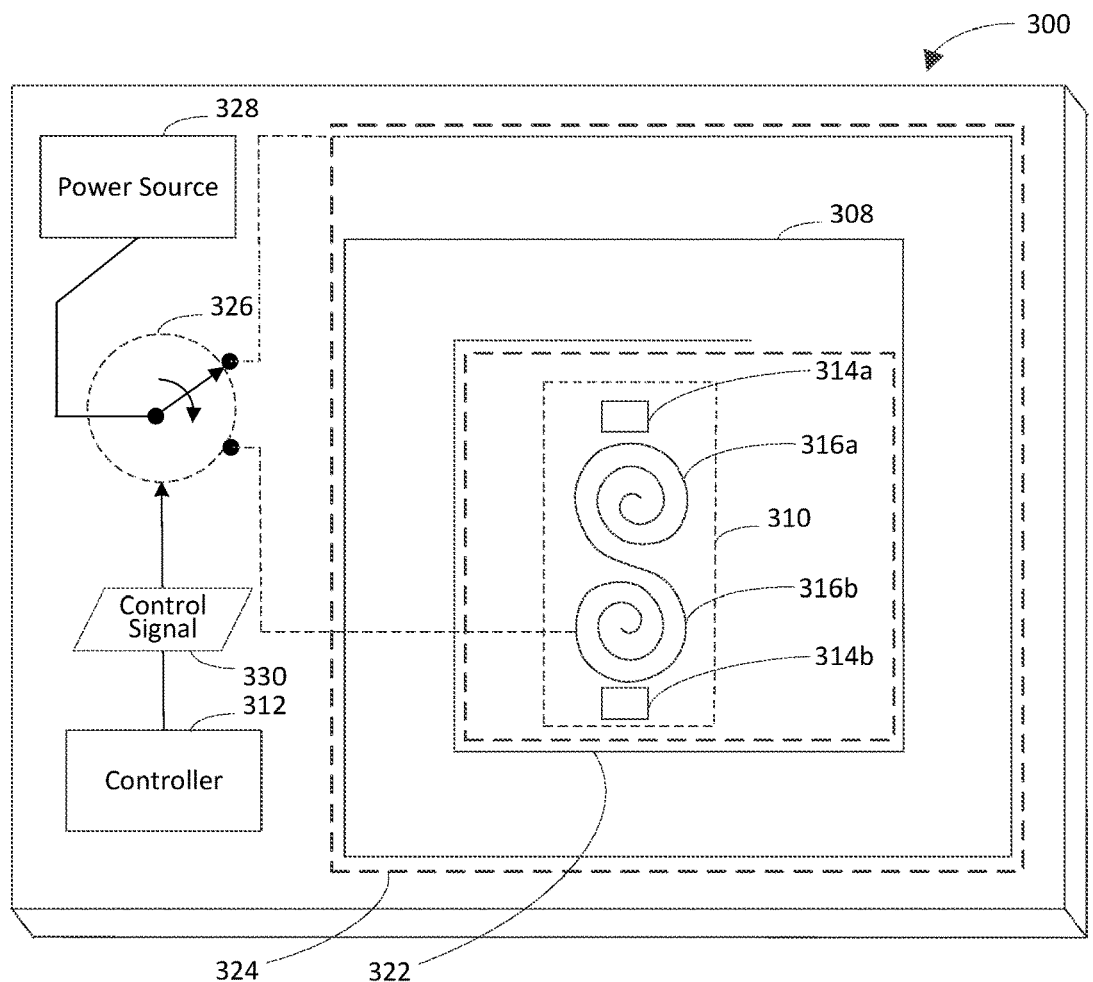

FIG. 3 is a block diagram of another example charging device 300. The charging device 300 is another example implementation of a charging device 106 shown in FIG. 1. The charging device 300 includes a first charging coil 308, a second charging coil 310, a first magnet 314a, and a second magnet 314b. The second charging coil 310 includes a first spiral 316a and a second spiral 316b. The first charging coil 308, the second charging coil 310, the first magnet 314a, the second magnet 314b, the first spiral 316a, and the second spiral 316b are operable in a manner similar to the first charging coil 208, the second charging coil 210, the first magnet 214a, the second magnet 214b, the first spiral 216a, and the second spiral 216b described above with reference to FIG. 2.

As shown in FIG. 3, the first charging coil 308 has an inner perimeter 322 and an outer perimeter 324. The second charging coil 310 is within the inner perimeter 322 of the first charging coil 308. The first charging coil 308 and the second charging coil 310 are planar. For example, the first charging coil 308 and the second charging coil 310 may be coplanar. In accordance with this example, the first charging coil 308 and the second charging coil 310 may be defined in the common plane in which the first spiral 316a and the second spiral 316b are defined. An outermost point of the first spiral 316a is shown to be connected to an outermost point of the second spiral 316b for non-limiting, illustrative purposes. It will be recognized that the first and second spirals 316a-316b may be connected in any suitable way or not at all, so long as current flows through the first spiral 316a in a first radial direction and current flows through the second spiral 316b in a second radial direction that is opposite the first radial direction.

The charging device 300 further includes a switch 326 and a power source 328. The switch 326 is configured to switch between first and second states based on a control signal 330 that is received from the controller 312. The first state is characterized by the switch 326 connecting the power source 328 to the first charging coil 308 to generate a first magnetic field for wirelessly transferring power to a first type of wireless device. The second state is characterized by the switch 326 connecting the power source 328 to the second charging coil 310 to generate a second magnetic field for wirelessly transferring power to a second type of wireless device. The power source 326 is configured to generate a current that is to be selectively provided to the first coil 308 or the second coil 310 based on whether the switch 326 is in the first state or the second state.

The controller 312 is configured to perform a seeking operation by causing the switch 326 to alternately switch between the first state during which the first charging coil 308 provides a first ping signal having the first frequency using the first magnetic field and the second state during which the second charging coil 310 provides a second ping signal having the second frequency using the second magnetic field. For example, the controller 312 may cause the switch 326 to periodically switch between the first state and the second state. In accordance with this example, the period between the first and second states may be any suitable amount of time. For instance, the period may be less than or equal to 0.5 seconds (sec), 1.0 sec, or 5 sec. Each of the first ping signal and the second ping signal may include one or more (e.g., a series of) magnetic pulses, though the scope of the example implementations is not limited in this respect. For instance, the magnetic pulses may be binary magnetic pulses. Attributes of the pulses (e.g., temporal spacings between the pulses, temporal lengths of the pulses, and presence or absence of the pulses) may communicate information to a chargeable wireless device. For instance, the attributes of the pulses may enable bi-directional communication (e.g., handshaking) with the chargeable wireless device. Each of the first and second ping signals may include enough power to wake up and communicate with a chargeable wireless device. The chargeable wireless device may use the power that is included in the first ping signal or the second ping signal to generate a response to the first ping signal or a response to the second ping signal, respectively. For instance, the response may communicate that the chargeable wireless device is of the first type or that the chargeable wireless device is of the second type.

The controller 312 is configured to perform a charging operation based at least in part on receipt of a response to the first ping signal or a response to the second ping signal from a chargeable wireless device. The controller 312 is configured to cause the first charging coil 308 to wirelessly transfer power to the chargeable wireless device based at least in part on receipt of the response to the first ping signal from the chargeable wireless device. In one example, the controller 312 may be configured to cause the first charging coil 308 to wirelessly transfer power to the chargeable wireless device further based on attributes of pulses in the response to the first ping signal specifying that the chargeable wireless device is of the first type. The controller 312 is configured to cause the second charging coil 310 to wirelessly transfer power to the chargeable wireless based at least in part on receipt of the response to the second ping signal from the chargeable wireless device. In one example, the controller 312 may be configured to cause the second charging coil 310 to wirelessly transfer power to the chargeable wireless device further based on attributes of pulses in the response to the second ping signal specifying that the chargeable wireless device is of the second type.

In an example implementation, the controller 312 receives an indication signal from the chargeable wireless device, indicating an amount of power that is received by the chargeable wireless device. In accordance with this implementation, the controller 312 compares the amount of power that is indicated by the indication signal to an amount of power that is transferred to the chargeable wireless device. In further accordance with this implementation, the controller 312 determines an efficiency with which the wireless power transfer is being performed based on the comparison. The controller 312 may take action based at least in part on the comparison.

For example, the controller may cause the amount of power that is being transferred to the chargeable wireless device to be increased or decreased based at least in part on the comparison. In accordance with this example, the controller 312 may cause the amount of power that is being transferred to the chargeable wireless device to be increased (or decreased) in response to (e.g., based at least in part on) the comparison indicating that a difference between the amount of power that is transferred to the chargeable wireless device and the amount of power that is received by the chargeable wireless device is less than a first threshold amount. In further accordance with this example, the controller 312 may cause the amount of power that is being transferred to the chargeable wireless device to be decreased (or increased) in response to the comparison indicating that the difference between the amount of power that is transferred to the chargeable wireless device and the amount of power that is received by the chargeable wireless device is greater than a second threshold amount. The first threshold amount and the second threshold amount may be the same or different. For instance, the second threshold amount may be greater than the first threshold amount.

It will be recognized that the charging device 300 may not include any one or more of the components shown in FIG. 3. For example, the charging device 300 may include the second charging coil 310 and not the first charging coil 308. In accordance with this example, the charging device 300 may not include the controller 312, the switch 326, and/or the power source 328. Furthermore, the charging device 300 may include component(s) in addition to or in lieu of any one or more of the components shown in FIG. 3. For instance, the charging device 300 may include multiple second charging coils, such that each second charging coil includes a respective first spiral and a respective second spiral through which currents flow in opposing radial directions.

Figure 4:
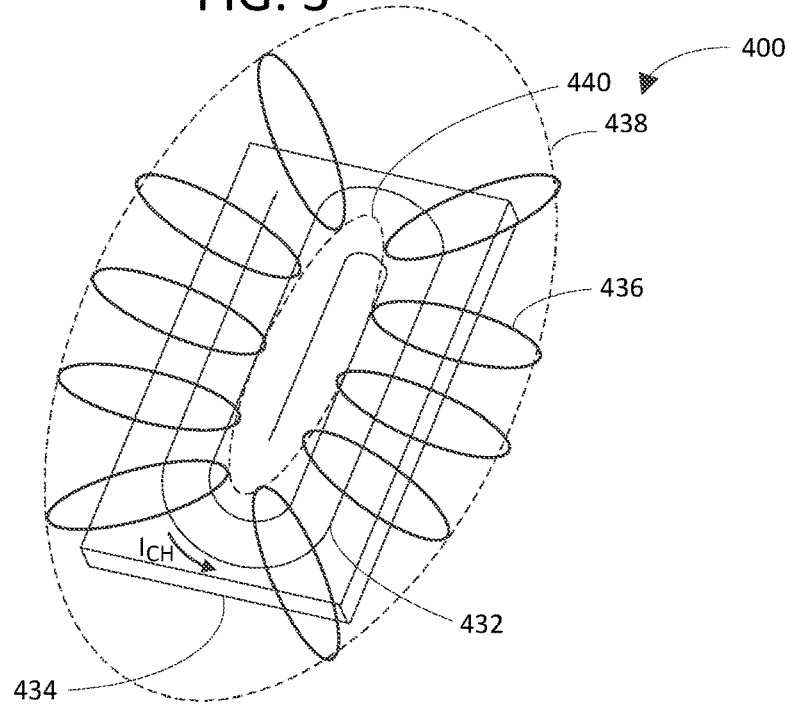
FIG. 4 is a perspective view of an example charging coil having a single spiral.

FIG. 4 is a perspective view of an example charging coil 400 having a single spiral 432. The spiral 432 is printed on a substrate 434 for non-limiting, illustrative purposes. As shown in FIG. 4, when a current $I_{CH}$ flows through the spiral 432, flux 436 is generated in a shape of a toroid. The toroid includes a toroid tube around a hole. The toroid tube has an outer perimeter 438 and an inner perimeter 440, which defines the hole. A plane in which the outer perimeter 438 and the inner perimeter 440 are defined is parallel (e.g., coincident) with a plane that includes the spiral 432. The flux 436 projects laterally from the spiral 432 such that the flux 436 may contact other components that are printed on the substrate 434 in the vicinity of the spiral 432. Because the plane in which the outer perimeter 438 and the inner perimeter 440 are defined is parallel with a plane in which the spiral 432 is defined, a distance that the flux 436 projects from the plane in which the spiral 432 is defined is relatively limited. The flux generation properties of the charging coil 400 will now be contrasted with the flux generation properties of a charging coil having spirals through which current flows in opposing radial directions.

Figure 5:
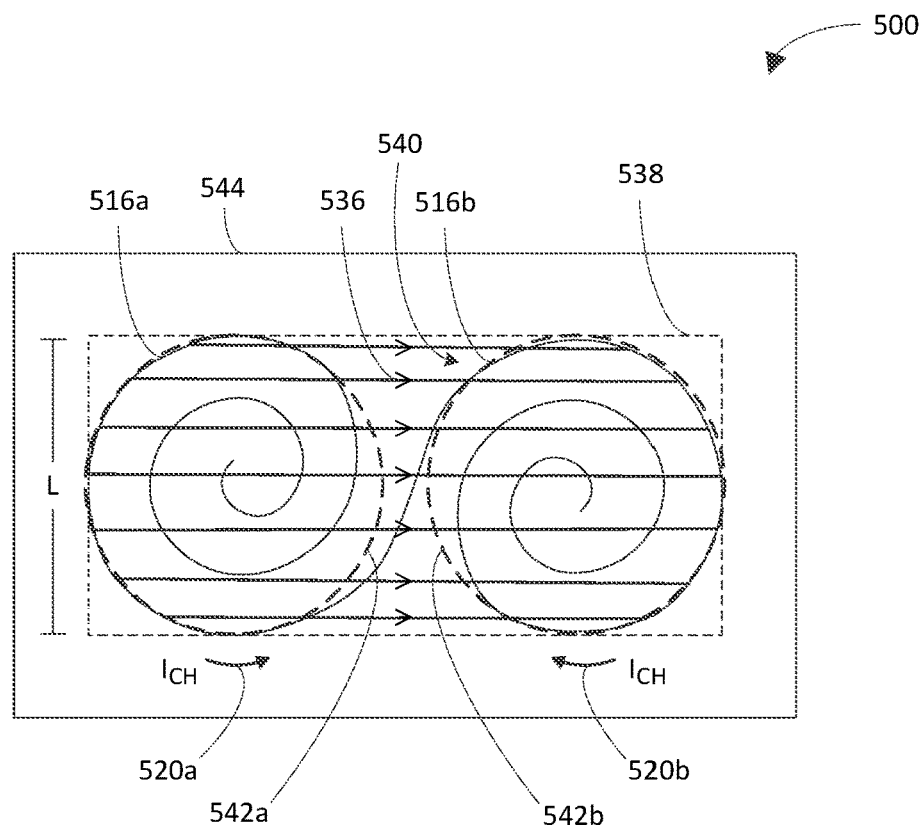
FIG. 5 is a top view of an example charging coil having spirals through which current flows in opposing radial directions.

FIG. 5 is a top view of an example charging coil 500 having first and second spirals 516a-516b through which current $I_{CH}$ flows in opposing radial directions, as depicted by arrows 520a-520b. An outermost point of the first spiral 516a is shown to be connected to an outermost point of the second spiral 516b for illustrative purposes and is not intended to be limiting. It will be recognized that the first and second spirals 516a-516b may be connected in any suitable way or not at all, so long as current flows through the first spiral 516a in a first radial direction and current flows through the second spiral 516b in a second radial direction that is opposite the first radial direction. It will be recognized that the current that flows through the first spiral 516a need not necessarily be the same as the current that flows through the second spiral 516b. For instance, if the first spiral 516a is not connected to the second spiral 516b, a first current may flow through the first spiral 516a, and a second current that is different from the first current may flow through the second spiral 516b. The charging coil 500 is shown in FIG. 5 to be formed on a substrate 544 for non-limiting, illustrative purposes.

The charging coil 500 is configured to wirelessly transfer power to a specified chargeable wireless device by projecting flux 536 from a designated face 540 of the coil 500 (e.g., a plane in which the first and second spirals 516a-516b are defined) toward a face of the specified chargeable wireless device. The flux 536 is generated by the current $I_{CH}$ flowing through the first and second spirals 516a-516b. The first and second spirals 516a-516b collaboratively focus the flux 536 in a shape of a toroid having first and second cross-sections 542a-542b that intersect the respective first and second spirals 516a-516b at the plane in which the first and second spirals 516a-516b are defined. In an example implementation, a projection of the flux 536 on the designated face 540 of the coil 500 is within a projection of a smallest rectangular area 538 that includes the first spiral 516a and the second spiral 516b on the designated face 540 of the coil 500.

A minor axis of a rectangle that is defined by the smallest rectangular area 538 that includes the first spiral 516a and the second spiral 516b may have a length L that is less than or equal to a threshold length. For instance, the threshold length L may be 3 mm, 5 mm, 8 mm, or 10 mm.

Figure 6:
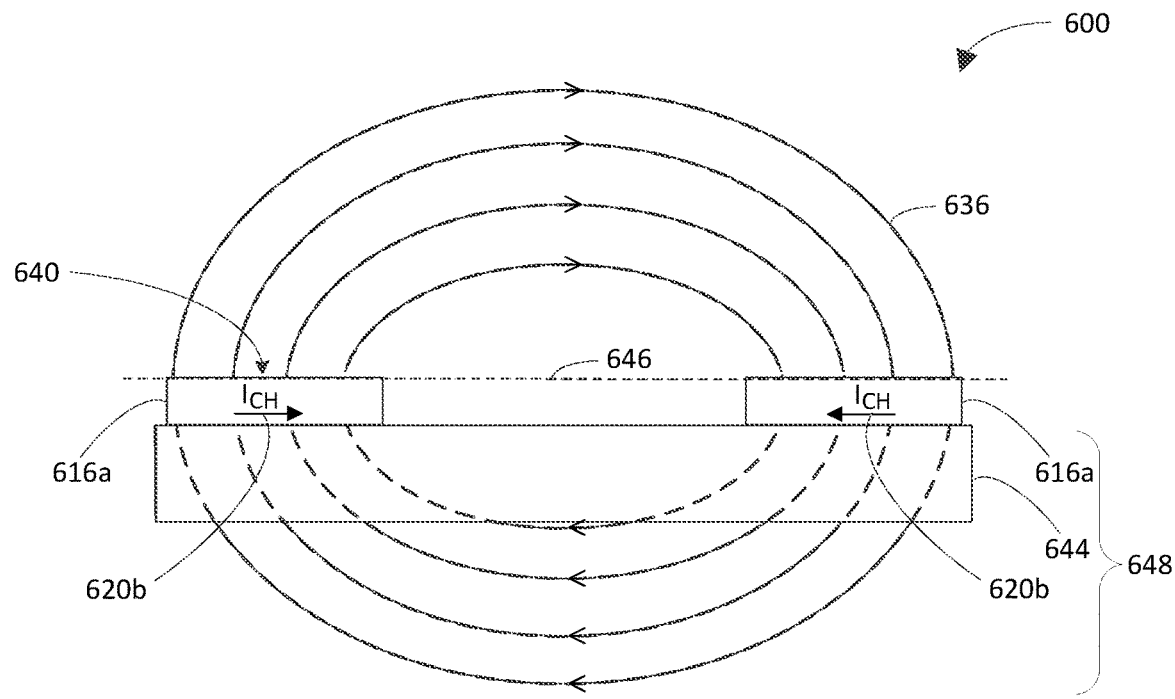
FIG. 6 is a side view of an example charging coil having spirals through which current flows in opposing radial directions.

FIG. 6 is a side view of an example charging coil 600 having spirals 616a-616b through which current $I_{CH}$ flows in opposing radial directions, as depicted by arrows 620a-620b. The charging coil 600 is shown in FIG. 6 to be formed on a substrate 644 for non-limiting, illustrative purposes. As shown in FIG. 6, flux 636 that is generated by the current $I_{CH}$ flowing through the first and second spirals 616a-616b is projected from a designated face 640 of the coil 600 toward a face of a specified chargeable wireless device. The first and second spirals 616a-616b collaboratively focus the flux 636 in a shape of a toroid having first and second cross-sections that intersect the respective first and second spirals 616a-616b at a plane 646 in which the first and second spirals 616a-616b are defined. The substrate 644 may be positioned between a layer of ferrite and the first and second spirals 616a-616b so that the layer of ferrite may reflect a portion 648 of the flux 636, which is directed toward the substrate 644, toward the face of the specified chargeable wireless device. For instance, the ferrite material may redirect the portion 648 to further focus the flux 436 in a direction toward the specified chargeable device. Focusing the flux 436 as described herein may reduce eddy currents in materials and/or structures that are proximate the charging coil 600.

Figure 7:
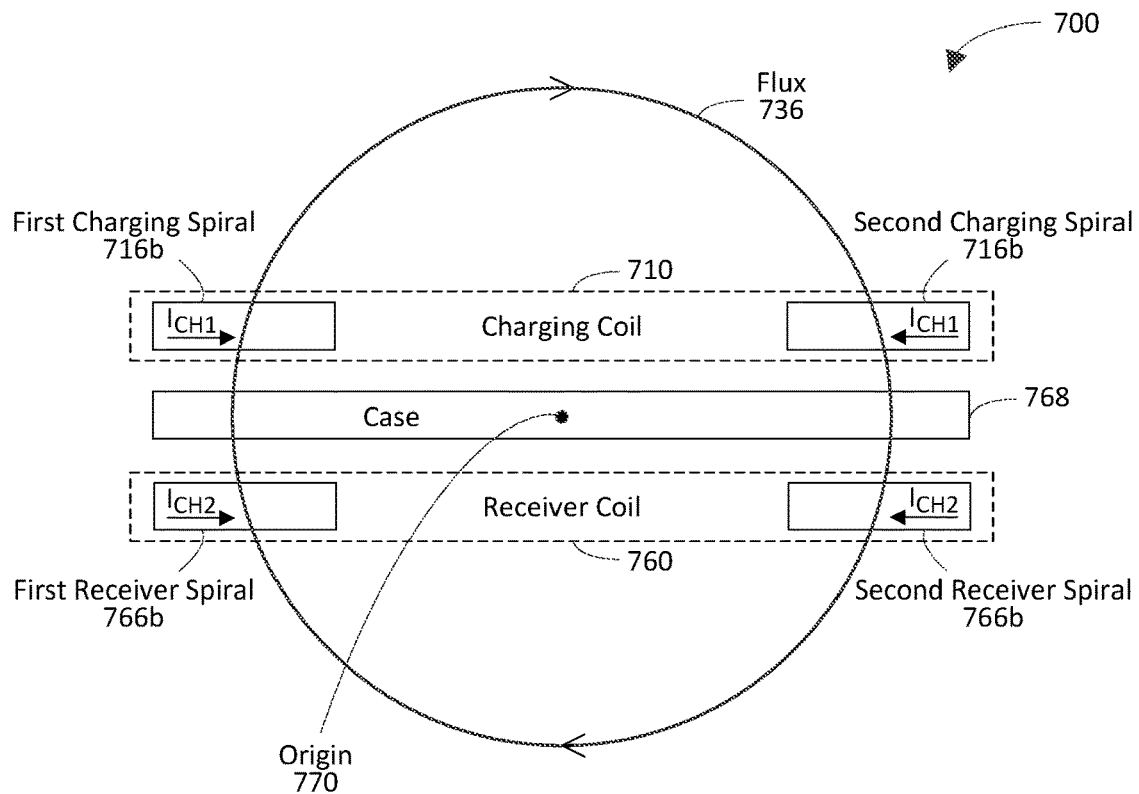
FIGS. 7-8 are side views of example charging systems that include coils having spirals through which current flows in opposing radial directions.

FIG. 7 is a side view of an example charging system 700. The charging system 700 includes a charging coil 710 and a receiving coil 760. For instance, the charging coil 710 may be included in a charging device (e.g., charging device 106, 200, or 300). The receiver coil 760 may be included in a chargeable wireless device (e.g., second chargeable wireless device 104). A case 768 is shown in FIG. 7 to be positioned between the charging coil 710 and the receiver coil 760 for non-limiting, illustrative purposes. For instance, the case 768 may be included in a charging device that includes the charging coil 710 or in a chargeable wireless device that includes the receiver coil 760. It will be recognized that the charging system 700 need not necessarily include the case 768. For instance, the charging coil 710 and the receiver coil 760 may be separated by air.

The charging coil 710 includes a first charging spiral 716a and a second charging spiral 716b. A first current $I_{CH1}$ flows through the first charging spiral 716a in a first radial direction and through the second charging spiral 716b in a second radial direction that is opposite the first radial direction. The receiver coil 760 includes a first receiver spiral 766a and a second receiver spiral 766b. A second current $I_{CH2}$ flows through the first receiver spiral 766a in the first radial direction and through the second receiver spiral 766b in the second radial direction. The first current $I_{CH1}$ and the second current $I_{CH2}$ may be substantially the same or different. The first current $I_{CH1}$ flowing through the first and second charging spirals 716a-716b and the second current $I_{CH2}$ flowing through the first and second receiver spirals 766a-766b as described above causes flux 736 to travel in a path around an origin 770 as shown in FIG. 7. For instance, the flux 736 may be focused in a shape of a toroid having first and second cross-sections that intersect the respective first and second charging spirals 716a-716b at a plane in which the first and second charging spirals 716a-716b are defined and having third and fourth cross-sections that intersect the respective first and second receiver spirals 766a-766b at a plane in which the first and second receiver spirals 766a-766b are defined.

Figure 8:
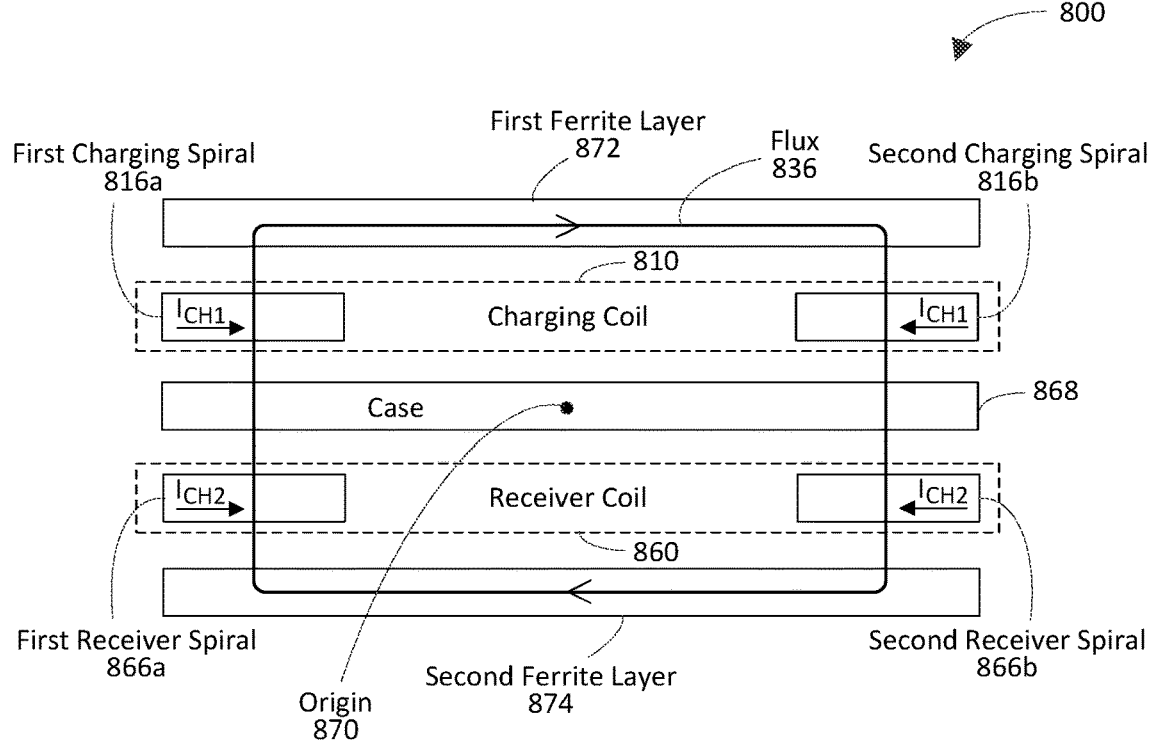

FIG. 8 is a side view of another example charging system 800. The charging system 800 includes a charging coil 810, a receiving coil 860, and a case 868, which are operable in a manner similar to the charging coil 710, the receiving coil 760, and the case 768 described above with reference to FIG. 7. For instance, the charging coil 810 includes first and second charging spirals 816a-816b through which a first current $I_{CH1}$ flows in opposing radial directions. The receiver coil 860 includes first and second receiver spirals 766a-766b through which a second current $I_{CH2}$ flows in opposing radial directions. The first current $I_{CH1}$ flowing through the first and second charging spirals 816a-816b and the second current $I_{CH2}$ flowing through the first and second receiver spirals 866a-866b as described above causes flux 836 to travel in a path around an origin 870 as described above with reference to FIG. 7. For instance, the flux 836 may be focused in a shape of a toroid having first and second cross-sections that intersect the respective first and second charging spirals 816a-816b at a plane in which the first and second charging spirals 816a-816b are defined and having third and fourth cross-sections that intersect the respective first and second receiver spirals 866a-866b at a plane in which the first and second receiver spirals 866a-866b are defined.

However, the charging system 800 further includes a first ferrite layer 872 and a second ferrite layer 874. The charging coil 810 is positioned between the first ferrite layer 872 and the case 868. The receiver coil 860 is positioned between the case 868 and the second ferrite layer 874. The first and second ferrite layers 872 and 874 serve to further focus the flux 836. For instance, the first and second ferrite layers 872 and 874 may change the shape of the flux 836 from the toroid that is generated by the first current $I_{CH1}$ flowing through the first and second charging spirals 816a-816b and the second current $I_{CH2}$ flowing through the first and second receiver spirals 866a-866b to a shape that has flattened edges along the first and second ferrite layers 870 and 872. The first and second ferrite layers 870 and 872 may prevent the flux 836 from going outside a boundary that is defined by the first and second ferrite layers 870 and 872. For example, the first and second ferrite layers 872 and 874 may shield electronic components that are outside the boundary from the flux 836. In another example, the first and second ferrite layers 872 and 874 may reduce (e.g., prevent) eddy current loss.

Figure 9:
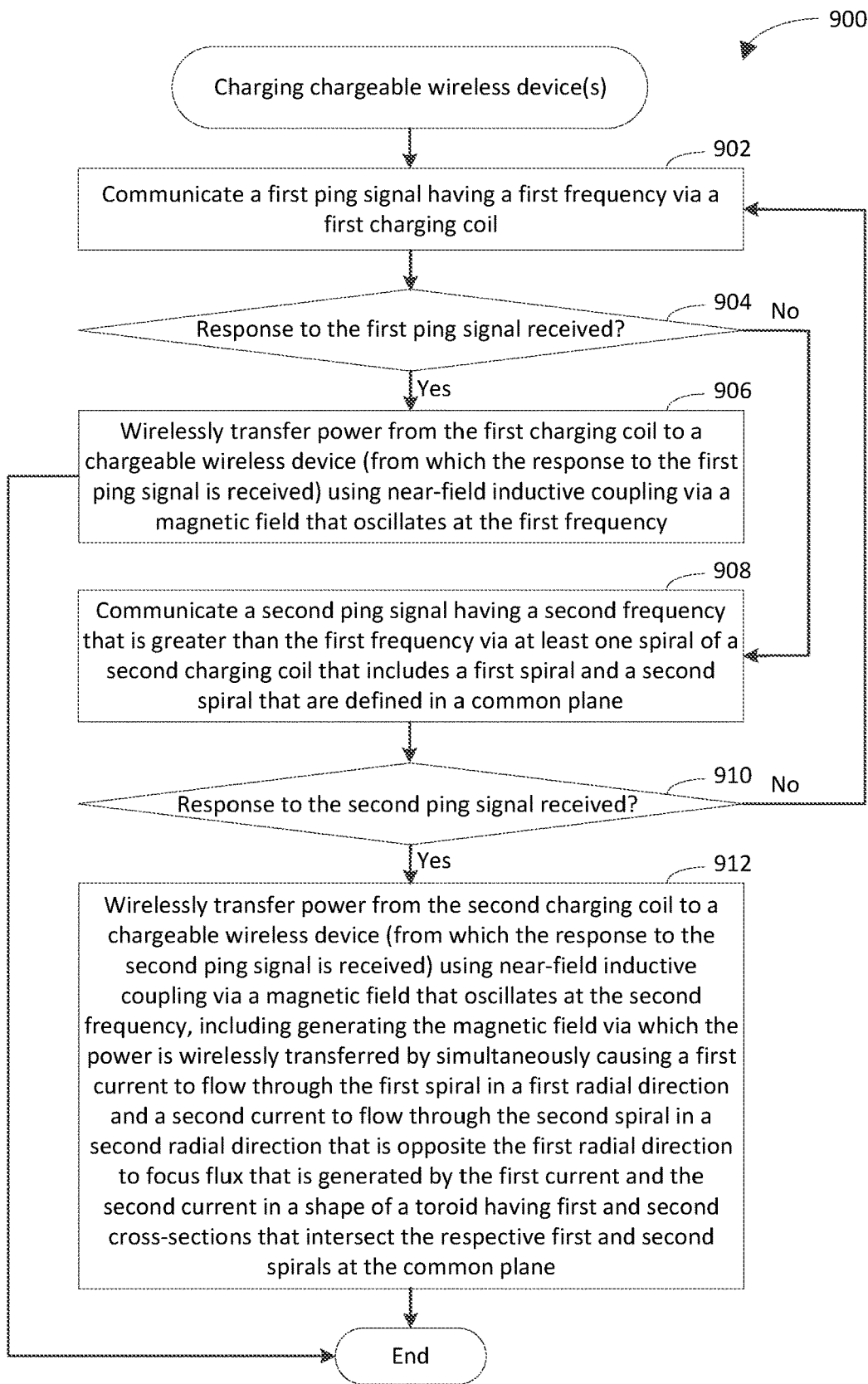
FIG. 9 depicts a flowchart of an example method of charging chargeable wireless device(s).

FIG. 9 depicts a flowchart 900 of an example method of charging chargeable wireless device(s). Flowchart 900 may be performed by any of charging devices 100, 200, and 300 shown in FIGS. 1, 2, and 3, for example. For illustrative purposes, flowchart 900 is described with respect to charging device 200 shown in FIG. 2, and reference is made to the flux 536 and 636 shown in FIGS. 5-6 to facilitate the discussion. Further structural and operational implementations will be apparent to persons skilled in the relevant art(s) based on the discussion regarding flowchart 900.

As shown in FIG. 9, the method of flowchart 900 begins at step 902. In step 902, a first ping signal having a first frequency is communicated via a first charging coil. The first frequency may be in a range between 100 kHz and 310 kHz, though the scope of the example implementations is not limited in this respect. In an example implementation, the first charging coil 208 communicates the first ping signal having the first frequency.

At step 904, a determination is made whether a response to the first ping signal is received. If a response to the first ping signal is received, flow continues to step 906. Otherwise, flow continues to step 908. In an example implementation, the controller 212 determines whether a response to the first ping signal is received. For example, the controller 212 may monitor signals that are received via the first charging coil 208 to determine whether a response to the first ping signal is received. In accordance with this example, the controller 212 may be configured to identify one or more designated attributes, which may indicate that a received signal is a response to the first ping signal. Examples of such an attribute may include but are not limited to a designated frequency, a designated amplitude, a designated phase, a designated duty cycle, and/or designated data encoded into the received signal. The controller 212 may determine that a received signal constitutes a response to the first ping signal based at least in part on the received signal having any one or more of the designated attributes.

At step 906, power is wirelessly transferred from the first charging coil to a chargeable wireless device from which the response to the first ping signal is received. The power is wirelessly transferred from the first charging coil at step 906 using near-field inductive coupling via a magnetic field that oscillates at the first frequency. For example, the power may be wirelessly transferred from the first charging coil at step 906 until the chargeable wireless device is fully charged (e.g., until an indicator, which indicates that the chargeable wireless device is fully charged, is received from the chargeable wireless device). In another example, the power may be wirelessly transferred from the first charging coil at step 906 for a specified (e.g., predetermined) period of time. Upon completion of step 906, flowchart 900 ends. Wirelessly transferring the power from the first charging coil at step 906 may be position-agnostic, though the example implementations are not limited in this respect. For instance, wirelessly transferring the power at step 906 may be performed regardless whether the chargeable wireless device is in a specified (e.g., predetermined) position and/or orientation. In an example implementation, the first charging coil 208 wirelessly transfers the power to the chargeable wireless device from which the response to the first ping signal is received. In accordance with this implementation, the controller 212 may control the first charging coil 208 to cause the first charging coil 208 to wirelessly transfer the power.

At step 908, a second ping signal having a second frequency that is greater than the first frequency is communicated via at least one spiral of a second charging coil that includes a first spiral and a second spiral that are defined in a common plane. The second frequency may be greater than or equal to a threshold frequency. For instance, the threshold frequency may be 5 MHz, 10 MHz, or 12 MHz. The second frequency may be in a range between 13 MHz and 14 MHz, though the scope of the example implementations is not limited in this respect. In an example implementation, the first spiral 216a and/or the second spiral 216b of the second charging coil 210 communicates the second ping signal having the second frequency. In accordance with this implementation, the first and second spirals 216a-216b are defined in the common plane.

At step 910, a determination is made whether a response to the second ping signal is received. If a response to the second ping signal is received, flow continues to step 912. Otherwise, flow returns to step 902. In an example implementation, the controller 212 determines whether a response to the second ping signal is received. For example, the controller 212 may monitor signals that are received via the second charging coil 210 to determine whether a response to the second ping signal is received. In accordance with this example, the controller 212 may be configured to identify one or more specified attributes, which may indicate that a received signal is a response to the second ping signal. Examples of such an attribute may include but are not limited to a designated frequency, a designated amplitude, a designated phase, a designated duty cycle, and/or designated data encoded into the received signal. The controller 212 may determine that a received signal constitutes a response to the second ping signal based at least in part on the received signal having any one or more of the specified attributes. In another example, the controller 212 may detect whether a chargeable wireless device is connected to the magnets 214a-214b. In accordance with this example, a signal received from the magnets 214a-214b indicating that the chargeable wireless device is connected to the magnets 214a-214b may constitute a response to the second ping signal or may be used in addition to or in lieu of the response to the second ping signal to determine whether power is to be wirelessly transferred from the second charging coil 210 to the chargeable wireless device.

At step 912, power is wirelessly transferred from the second charging coil to a chargeable wireless device from which the response to the second ping signal is received. The power is wirelessly transferred from the second charging coil at step 912 using near-field inductive coupling via a magnetic field that oscillates at the second frequency. Wirelessly transferring the power at step 912 includes generating the magnetic field via which the power is wirelessly transferred by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane. In one example, the power may be wirelessly transferred from the second charging coil at step 912 until the chargeable wireless device is fully charged (e.g., until an indicator, which indicates that the chargeable wireless device is fully charged, is received from the chargeable wireless device). In another example, the power may be wirelessly transferred from the second charging coil at step 912 for a specified (e.g., predetermined) period of time. Upon completion of step 912, flowchart 900 ends.

In one aspect, wirelessly transferring the power from the second charging coil at step 912 may include projecting the flux that is generated by the first current and the second current from a designated face of the second coil toward the chargeable wireless device. In accordance with this aspect, a projection of the flux on the designated face of the second coil may be within a smallest rectangular area defined by the first spiral and the second spiral on the designated face. A minor axis of a rectangle that is defined by the smallest rectangular area may have a length that is less than or equal to a threshold length. For instance, the threshold length may be 2 mm, 3 mm, 5 mm, or 7 mm.

In another aspect, wirelessly transferring the power from the second charging coil at step 912 may include wirelessly transferring the power from the second charging coil, which is adjacent to the first charging coil, to the chargeable wireless device.

In yet another aspect, wirelessly transferring the power from the second charging coil at step 912 may include wirelessly transferring the power from the second charging coil, which is surrounded by an inner perimeter of the first charging coil and which is coplanar with the first charging coil, to the chargeable wireless device.

In an example implementation, the second charging coil 210 wirelessly transfers the power to the chargeable wireless device from which the response to the second ping signal is received. In accordance with this implementation, the controller 212 may control the second charging coil 210 to cause the second charging coil 210 to wirelessly transfer the power. In accordance with this implementation, the second charging coil 210 generates the magnetic field via which the power is wirelessly transferred by simultaneously causing a first current to flow through the first spiral 216a in a first radial direction and a second current to flow through the second spiral 216b in a second radial direction that is opposite the first radial direction to focus flux (e.g., flux 536 and/or flux 636 shown in FIGS. 5-6) that is generated by the first current and the second current in a shape of a toroid having first and second cross-sections (e.g., first and second cross-sections 542a-542b shown in FIG. 5) that intersect the respective first and second spirals 216a-216b at the common plane (e.g., plane 646 shown in FIG. 6).

Wirelessly transferring the power from the second charging coil at step 912 may be position-specific, though the example implementations are not limited in this respect. For instance, wirelessly transferring the power at step 912 may be performed only if the chargeable wireless device is in a specified (e.g., predetermined) position and/or orientation. For example, the controller 212 may be configured to determine whether the chargeable wireless device is in the specified position and/or orientation. In accordance with this example, the controller 212 may be configured to wirelessly transfer the power to the chargeable wireless device in response to the chargeable wireless device being in the specified position and/or orientation. In further accordance with this example, the controller 212 may be configured to not wirelessly transfer the power to the chargeable wireless device in response to the chargeable wireless device not being in the specified position and/or orientation.

Although flowchart 900 is shown to end upon completion of step 906 and upon completion of step 912, it will be recognized that 900 need not necessarily end. For instance, the method of flowchart 900 may be performed iteratively. In one example implementation, flow continues to step 902 upon completion of step 906 and/or upon completion of step 912. In another example implementation, flow continues to step 908 upon completion of step 906. In accordance with this implementation, communicating the second ping signal at step 908 in response to wirelessly transferring the power from the first charging coil at step 906 may serve to give the first charging coil and the second charging coil equal opportunity to charge respective chargeable wireless devices. For instance, if the first charging coil wirelessly transfers power at 906, the method of flowchart 900 may be continued at step 908; if the second charging coil wirelessly transfers power at step 912, the method of flowchart 900 may be performed again starting at 902.

It will be further recognized that any one or more of the steps of flowchart 900 may be performed in any suitable order and/or concurrently. For example, communicating the first ping signal at step 902 and communicating the second ping signal at step 908 may be performed simultaneously. In another example, wireless transferring power from the first charging coil at step 906 and wirelessly transferring power from the second charging coil at step 912 may be performed simultaneously.

In some example implementations, one or more steps 902, 904, 906, 908, 910, and/or 912 of flowchart 900 may not be performed. Moreover, steps in addition to or in lieu of steps 902, 904, 906, 908, 910, and/or 912 may be performed. For instance, in an example implementation, the method of flowchart 900 further includes aligning an orientation and a position of the chargeable wireless device from which the response to the second ping signal is received with the second charging coil using a magnetic force that is generated by one or more magnets of a charging device that includes the second charging coil. For instance, a relative orientation of the chargeable wireless device may be changed with reference to the charging device using the magnetic force such that the second charging coil becomes aligned with a corresponding coil of the chargeable wireless device. In an aspect of this implementation, the magnets 214a-214b may align the orientation and the position of the chargeable wireless device with the second charging coil 210 using a magnetic force that is generated by one or more magnets 214a-214b.

In another example implementation, the method of flowchart 900 further includes maintaining alignment of the second charging coil with a corresponding coil of the chargeable wireless device from which the response to the second ping signal is received while the power is being wirelessly transferred from the second charging coil to the chargeable wireless device by mechanically and releasably attaching a charging device that includes the second charging coil to the chargeable wireless device.

In yet another example implementation, the method of flowchart 900 further includes physically aligning the chargeable wireless device from which the response to the second ping signal is received with the second charging coil by holding the chargeable wireless device in a mechanical trough.

In still another example implementation, the method of flowchart 900 further includes maintaining alignment of the second charging coil with a corresponding coil of the chargeable wireless device from which the response to the second ping signal is received with an accuracy of 1 mm in all directions in three-dimensional space while the power is being wirelessly transferred from the second charging coil to the chargeable wireless device. For instance, the magnets 214a-214b and/or another alignment structure may maintain the alignment of the second charging coil 210 with the corresponding coil of the chargeable wireless device with the accuracy of 1 mm.

III. Further Discussion of Some Example Implementations

A first example charging device comprises a first charging coil, a second charging coil, and a controller. The first charging coil is configured to wirelessly transfer power to a first type of wireless device using near-field inductive coupling via a first magnetic field that oscillates at a first frequency. The second charging coil is configured to wirelessly transfer power to a second type of wireless device using near-field inductive coupling via a second magnetic field that oscillates at a second frequency that is greater than the first frequency. The second charging coil includes a first spiral and a second spiral that are defined in a common plane. The controller is configured to determine whether a chargeable wireless device is of the first type or the second type. The controller is configured to cause the first charging coil to wirelessly transfer power to the chargeable wireless device in response to the chargeable wireless device being of the first type. The controller is configured to cause the second charging coil to wirelessly transfer power to the chargeable wireless device by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane in response to the chargeable wireless device being of the second type.

In a first aspect of the first example charging device, the first example charging device further comprises a switch configured to switch between first and second states based on a control signal. The first state is characterized by the switch connecting a power source to the first charging coil to generate the first magnetic field. The second state is characterized by the switch connecting the power source to the second charging coil to generate the second magnetic field. The controller is configured to perform a seeking operation by causing the switch to alternately switch between the first state during which the first charging coil provides a first ping signal having the first frequency using the first magnetic field and the second state during which the second charging coil provides a second ping signal having the second frequency using the second magnetic field. The controller is configured to perform a charging operation based at least in part on receipt of a response to the first ping signal or a response to the second ping signal from the chargeable wireless device. The controller is configured to cause the first charging coil to wirelessly transfer power to the chargeable wireless device based at least in part on receipt of the response to the first ping signal from the chargeable wireless device. The controller is configured to cause the second charging coil to wirelessly transfer power to the chargeable wireless based at least in part on receipt of the response to the second ping signal from the chargeable wireless device.

In a second aspect of the first example charging device, the first example charging device further comprises one or more magnets configured to align an orientation and a position of a specified chargeable wireless device of the second type with the second charging coil. The second aspect of the first example charging device may be implemented in combination with the first aspect of the first example charging device, though the example implementations are not limited in this respect.

In a third aspect of the first example charging device, the first example charging device further comprises a mechanical fastener configured to mechanically and releasably attach the charging device to a specified chargeable wireless device of the second type such that alignment of the second charging coil with a corresponding coil of the specified chargeable wireless device is maintained while the second charging coil wirelessly transfers power to the specified chargeable wireless device. The third aspect of the first example charging device may be implemented in combination with the first and/or second aspect of the first example charging device, though the example implementations are not limited in this respect.

In a fourth aspect of the first example charging device, the first example charging device further comprises a mechanical trough configured to physically align a specified chargeable wireless device of the second type with the second charging coil. The fourth aspect of the first example charging device may be implemented in combination with the first, second, and/or third aspect of the first example charging device, though the example implementations are not limited in this respect.

In a fifth aspect of the first example charging device, the first example charging device further comprises an alignment structure configured to maintain alignment of a specified chargeable wireless device of the second type with the second charging coil with an accuracy of 1 mm in all directions in three-dimensional space while the second charging coil wirelessly transfers power to the specified chargeable wireless device. The fifth aspect of the first example charging device may be implemented in combination with the first, second, third, and/or fourth aspect of the first example charging device, though the example implementations are not limited in this respect.

In a sixth aspect of the first example charging device, the second charging coil is configured to wirelessly transfer power to a specified chargeable wireless device of the second type by projecting the flux that is generated by the first current and the second current from a designated face of the charging device toward a face of the specified chargeable wireless device. In accordance with the sixth aspect, a projection of the flux on the designated face of the charging device is within a projection of a smallest rectangular area that includes the first spiral and the second spiral on the face of the charging device. The sixth aspect of the first example charging device may be implemented in combination with the first, second, third, fourth, and/or fifth aspect of the first example charging device, though the example implementations are not limited in this respect.

In a first example implementation of the sixth aspect of the first example charging device, a minor axis of a rectangle that is defined by the smallest rectangular area that includes the first spiral and the second spiral has a length that is less than or equal to 10 mm.

In a second example implementation of the sixth aspect of the first example charging device, a minor axis of a rectangle that is defined by the smallest rectangular area that includes the first spiral and the second spiral has a length that is less than or equal to 5 mm.

In a seventh aspect of the first example charging device, the first frequency is in a range between 100 kHz and 310 kHz. The seventh aspect of the first example charging device may be implemented in combination with the first, second, third, fourth, fifth, and/or sixth aspect of the first example charging device, though the example implementations are not limited in this respect.

In an eighth aspect of the first example charging device, the second frequency is in a range between 13 MHz and 14 MHz. The eighth aspect of the first example charging device may be implemented in combination with the first, second, third, fourth, fifth, sixth, and/or seventh aspect of the first example charging device, though the example implementations are not limited in this respect.

In a ninth aspect of the first example charging device, the second frequency is greater than or equal to 1 MHz. The ninth aspect of the first example charging device may be implemented in combination with the first, second, third, fourth, fifth, sixth, seventh, and/or eighth aspect of the first example charging device, though the example implementations are not limited in this respect.

In a tenth aspect of the first example charging device, the second frequency is greater than or equal to 5 MHz. The tenth aspect of the first example charging device may be implemented in combination with the first, second, third, fourth, fifth, sixth, seventh, eighth, and/or ninth aspect of the first example charging device, though the example implementations are not limited in this respect.

In an eleventh aspect of the first example charging device, the first charging coil and the second charging coil are planar and are defined in the common plane. In accordance with the eleventh aspect, the charging device is incorporated in a power adapter of a computer. The eleventh aspect of the first example charging device may be implemented in combination with the first, second, third, fourth, fifth, sixth, seventh, eighth, ninth, and/or tenth aspect of the first example charging device, though the example implementations are not limited in this respect.

In a twelfth aspect of the first example charging device, the first charging coil is configured to wirelessly transfer power of greater than one watt to the first type of wireless device. In accordance with the twelfth aspect, the second charging coil is configured to wirelessly transfer power of less than one watt to the second type of wireless device. The twelfth aspect of the first example charging device may be implemented in combination with the first, second, third, fourth, fifth, sixth, seventh, eighth, ninth, tenth, and/or eleventh aspect of the first example charging device, though the example implementations are not limited in this respect.

In a thirteenth aspect of the first example charging device, the first charging coil and the second charging coil are planar and are defined in the common plane. In accordance with the thirteenth aspect, the first charging coil has an inner perimeter and an outer perimeter. In further accordance with the thirteenth aspect, the second charging coil is within the inner perimeter of the first charging coil. The thirteenth aspect of the first example charging device may be implemented in combination with the first, second, third, fourth, fifth, sixth, seventh, eighth, ninth, tenth, eleventh, and/or twelfth aspect of the first example charging device, though the example implementations are not limited in this respect.

In a fourteenth aspect of the first example charging device, the first charging coil and the second charging coil are non-overlapping. The fourteenth aspect of the first example charging device may be implemented in combination with the first, second, third, fourth, fifth, sixth, seventh, eighth, ninth, tenth, eleventh, and/or twelfth aspect of the first example charging device, though the example implementations are not limited in this respect.

In an example implementation of the fourteenth aspect of the first example charging device, the controller is configurable to cause the first and second charging coils to wirelessly transfer power to respective first and second chargeable wireless devices simultaneously.

A second example charging device comprises a first charging coil, a second charging coil, and a controller. The first charging coil configured to wirelessly transfer power to a Qi-enabled device using near-field inductive coupling in accordance with a Qi open interface standard via a first magnetic field that oscillates at a first frequency in a range between 100 kHz and 310 kHz. The second charging coil configured to wirelessly transfer power to a near-field-communication-enabled device using near-field inductive coupling via a second magnetic field that oscillates at a second frequency of approximately 13.6 MHz. The second charging coil includes a first spiral and a second spiral that are defined in a common plane. The controller is configured to determine whether a specified chargeable wireless device is a Qi-enabled device corresponding to the first charging coil or a near-field-communication-enabled device corresponding to the second charging coil. The controller is configured to cause the first charging coil to wirelessly transfer power to the specified chargeable wireless device in response to the specified chargeable wireless device being a Qi-enabled device corresponding to the first charging coil. The controller is configured to cause the second charging coil to wirelessly transfer power to the specified chargeable wireless device by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane in response to the specified chargeable wireless device being a near-field-communication-enabled device corresponding to the second charging coil.

In an example method of charging a chargeable wireless device, (a) communicating a first ping signal having a first frequency via a first charging coil and (b) communicating a second ping signal having a second frequency that is greater than the first frequency via at least one spiral of a second charging coil that includes a first spiral and a second spiral that are defined in a common plane are alternately performed. A response signal is received from a chargeable wireless device. A determination is made that the response signal is a response to the second ping signal. Power is wirelessly transferred from the second charging coil to the chargeable wireless device using near-field inductive coupling via a magnetic field that oscillates at the second frequency based at least in part on a determination that the response signal is the response to the second ping signal, said wirelessly transferring the power comprising. The magnetic field via which the power is wirelessly transferred is generated by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane.

In a first aspect of the example method, the example method further comprises aligning an orientation and a position of the chargeable wireless device with the second charging coil using a magnetic force that is generated by one or more magnets of a charging device that includes the second charging coil.

In a second aspect of the example method, the example method further comprises maintaining alignment of the second charging coil with a corresponding coil of the chargeable wireless device while the power is being wirelessly transferred from the second charging coil to the chargeable wireless device by mechanically and releasably attaching a charging device that includes the second charging coil to the chargeable wireless device. The second aspect of the example method may be implemented in combination with the first aspect of the example method, though the example implementations are not limited in this respect.

In a third aspect of the example method, the example method further comprises physically aligning the chargeable wireless device with the second charging coil by holding the chargeable wireless device in a mechanical trough. The third aspect of the example method may be implemented in combination with the first and/or second aspect of the example method, though the example implementations are not limited in this respect.

In a fourth aspect of the example method, the example method further comprises maintaining alignment of the second charging coil with a corresponding coil of the chargeable wireless device with an accuracy of 1 mm in all directions in three-dimensional space while the power is being wirelessly transferred from the second charging coil to the chargeable wireless device. The fourth aspect of the example method may be implemented in combination with the first, second, and/or third aspect of the example method, though the example implementations are not limited in this respect.

In a fifth aspect of the example method, wirelessly transferring the power comprises projecting the flux that is generated by the first current and the second current from a designated face of the second coil toward the chargeable wireless device. In accordance with the fifth aspect, a projection of the flux on the designated face of the second coil is within a smallest rectangular area defined by the first spiral and the second spiral on the designated face. The fifth aspect of the example method may be implemented in combination with the first, second, third, and/or fourth aspect of the example method, though the example implementations are not limited in this respect.

In an example implementation of the sixth aspect of the example method, a minor axis of a rectangle that is defined by the smallest rectangular area has a length that is less than or equal to 5 mm.

In a sixth aspect of the example method, the first frequency is in a range between 100 kHz and 310 kHz. In accordance with the sixth aspect, the second frequency is in a range between 13 MHz and 14 MHz. The sixth aspect of the example method may be implemented in combination with the first, second, third, fourth, and/or fifth aspect of the example method, though the example implementations are not limited in this respect.

In a seventh aspect of the example method, the second frequency is greater than or equal to 5 MHz. The seventh aspect of the example method may be implemented in combination with the first, second, third, fourth, fifth, and/or sixth aspect of the example method, though the example implementations are not limited in this respect.

In an eighth aspect of the example method, wirelessly transferring the power comprises wirelessly transferring the power from the second charging coil, which is surrounded by an inner perimeter of the first charging coil and which is coplanar with the first charging coil, to the chargeable wireless device. The eighth aspect of the example method may be implemented in combination with the first, second, third, fourth, fifth, sixth, and/or seventh aspect of the example method, though the example implementations are not limited in this respect.

In a ninth aspect of the example method, wirelessly transferring the power comprises wirelessly transferring the power from the second charging coil, which is adjacent to the first charging coil, to the chargeable wireless device. The ninth aspect of the example method may be implemented in combination with the first, second, third, fourth, fifth, sixth, and/or seventh aspect of the example method, though the example implementations are not limited in this respect.

In an example implementation of the ninth aspect of the example method, the example method further comprises receiving a second response signal from a second chargeable wireless device. In accordance with this example implementation, the example method further comprises determining that the second response signal is a response to the first ping signal. In further accordance with this example implementation, the example method further comprises wirelessly transferring power from the first charging coil to the second chargeable wireless device using near-field inductive coupling via a second magnetic field that oscillates at the first frequency based at least in part on a determination that the second response signal is the response to the first ping signal. In further accordance with this example implementation, wirelessly transferring power from the second charging coil to the chargeable wireless device from which the response to the second ping signal is received and wirelessly transferring power from the first charging coil to the second chargeable wireless device are performed simultaneously.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A charging device comprising:
 a first charging coil configured to wirelessly transfer power to a first type of wireless device using near-field inductive coupling via a first magnetic field that oscillates at a first frequency;
 a second charging coil configured to wirelessly transfer power to a second type of wireless device using near-field inductive coupling via a second magnetic field that oscillates at a second frequency that is greater than the first frequency, the second charging coil including a first spiral and a second spiral that are defined in a common plane; and
 a controller configured to determine whether a chargeable wireless device is of the first type or the second type, the controller configured to cause the first charging coil to wirelessly transfer power to the chargeable wireless device in response to the chargeable wireless device being of the first type, the controller configured to cause the second charging coil to wirelessly transfer power to the chargeable wireless device by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane in response to the chargeable wireless device being of the second type, the controller configurable to cause the first and second charging coils to wirelessly transfer power to respective first and second chargeable wireless devices of the respective first and second types simultaneously such that the first charging coil wirelessly transfers power of greater than one watt to the first chargeable wireless device of the first type simultaneously with the second charging coil wirelessly transferring power of less than one watt to the second chargeable wireless device of the second type.

2. The charging device of claim 1, further comprising:
 a switch configured to switch between first and second states based on a control signal,
  the first state characterized by the switch connecting a power source to the first charging coil to generate the first magnetic field,
  the second state characterized by the switch connecting the power source to the second charging coil to generate the second magnetic field;
 wherein the controller is configured to perform a seeking operation by causing the switch to alternately switch between the first state during which the first charging coil provides a first ping signal having the first frequency using the first magnetic field and the second state during which the second charging coil provides a second ping signal having the second frequency using the second magnetic field; and
 wherein the controller is configured to perform a charging operation based at least in part on receipt of a response to the first ping signal or a response to the second ping signal from the chargeable wireless device, the controller configured to cause the first charging coil to wirelessly transfer power to the chargeable wireless device based at least in part on receipt of the response to the first ping signal from the chargeable wireless device, the controller configured to cause the second charging coil to wirelessly transfer power to the chargeable wireless device based at least in part on receipt of the response to the second ping signal from the chargeable wireless device.

3. The charging device of claim 2, wherein the controller is configured to perform the seeking operation by causing the switch to alternately switch between the first state and the second state periodically with a period of less than or equal to five seconds.

4. The charging device of claim 1, further comprising:
 one or more magnets configured to align an orientation and a position of a specified chargeable wireless device of the second type with the second charging coil.

5. The charging device of claim 1, further comprising:
 a mechanical fastener configured to mechanically and releasably attach the charging device to a specified chargeable wireless device of the second type such that alignment of the second charging coil with a corresponding coil of the specified chargeable wireless device is maintained while the second charging coil wirelessly transfers power to the specified chargeable wireless device.

6. The charging device of claim 1, further comprising:
a mechanical trough configured to physically align a specified chargeable wireless device of the second type with the second charging coil.

7. The charging device of claim 1, further comprising:
an alignment structure configured to maintain alignment of a specified chargeable wireless device of the second type with the second charging coil with an accuracy of 1 mm in all directions in three-dimensional space while the second charging coil wirelessly transfers power to the specified chargeable wireless device.

8. The charging device of claim 1, wherein the second charging coil is configured to wirelessly transfer power to a specified chargeable wireless device of the second type by projecting the flux that is generated by the first current and the second current from a designated face of the charging device toward a face of the specified chargeable wireless device; and
wherein a projection of the flux on the designated face of the charging device is within a projection of a smallest rectangular area that includes the first spiral and the second spiral on the face of the charging device.

9. The charging device of claim 8, wherein a minor axis of a rectangle that is defined by the smallest rectangular area that includes the first spiral and the second spiral has a length that is less than or equal to 10 mm.

10. The charging device of claim 1, wherein the first frequency is in a range between 100 kHz and 310 kHz.

11. The charging device of claim 1, wherein the second frequency is in a range between 13 MHz and 14 MHz.

12. The charging device of claim 1, wherein the second frequency is greater than or equal to 1 MHz.

13. The charging device of claim 1, wherein the first charging coil and the second charging coil are non-overlapping.

14. The charging device of claim 1, wherein the first charging coil and the second charging coil are planar and are defined in the common plane;
wherein the first charging coil has an inner perimeter and an outer perimeter; and
wherein the second charging coil is within the inner perimeter of the first charging coil.

15. The charging device of claim 1, wherein the first charging coil and the second charging coil are planar and are defined in the common plane; and
wherein the charging device is incorporated in a power adapter of a computer.

16. A method of charging a chargeable wireless device, the method comprising:
alternately switching between (a) a first state during which a first charging coil provides a first ping signal having a first frequency and (b) a second state during which at least one spiral of a second charging coil that includes a first spiral and a second spiral that are defined in a common plane provides a second ping signal having a second frequency that is greater than the first frequency, the alternately switching between the first state and the second state performed periodically with a period of less than or equal to five seconds;
receiving a response signal from a chargeable wireless device;
determining that the response signal is a response to the second ping signal; and
wirelessly transferring power from the second charging coil to the chargeable wireless device using near-field inductive coupling via a magnetic field that oscillates at the second frequency based at least in part on a determination that the response signal is the response to the second ping signal, said wirelessly transferring the power comprising:
generating the magnetic field via which the power is wirelessly transferred by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane.

17. The method of claim 16, wherein wirelessly transferring the power comprises:
projecting the flux that is generated by the first current and the second current from a designated face of the second coil toward the chargeable wireless device; and
wherein a projection of the flux on the designated face of the second coil is within a smallest rectangular area defined by the first spiral and the second spiral on the designated face.

18. The method of claim 16, wherein the first frequency is in a range between 100 kHz and 310 kHz; and
wherein the second frequency is in a range between 13 MHz and 14 MHz.

19. The method of claim 16, wherein the second frequency is greater than or equal to 5 MHz.

20. The method of claim 16, wherein wirelessly transferring the power comprises:
wirelessly transferring the power from the second charging coil, which is adjacent to the first charging coil, to the chargeable wireless device;
wherein the method further comprises:
receiving a second response signal from a second chargeable wireless device;
determining that the second response signal is a response to the first ping signal; and
wirelessly transferring power from the first charging coil to the second chargeable wireless device using near-field inductive coupling via a second magnetic field that oscillates at the first frequency based at least in part on a determination that the second response signal is the response to the first ping signal; and
wherein wirelessly transferring power from the second charging coil to the chargeable wireless device from which the response to the second ping signal is received and wirelessly transferring power from the first charging coil to the second chargeable wireless device are performed simultaneously.

21. The method of claim 16, further comprising:
receiving an indication signal from the chargeable wireless device, the indication signal indicating an amount of power that the chargeable wireless device receives;
comparing the amount of power that is indicated by the indication signal to an amount of power that is transferred from the second charging coil to the chargeable wireless device;
determining an efficiency with which a transfer of the power from the second charging coil to the chargeable wireless device is being performed based on a comparison of the amount of power that is indicated by the indication signal to the amount of power that is transferred from the second charging coil to the chargeable wireless device; and causing the amount of power that is being transferred from the second charging coil to the chargeable wireless device to be increased or decreased based at least in part on the determined efficiency.

22. A charging device comprising:
a first charging coil configured to wirelessly transfer power to a Qi-enabled device using near-field inductive coupling in accordance with a Qi open interface standard via a first magnetic field that oscillates at a first frequency in a range between 100 kHz and 310 kHz;
a second charging coil configured to wirelessly transfer power to a near-field-communication-enabled device using near-field inductive coupling via a second magnetic field that oscillates at a second frequency of approximately 13.6 MHz, the second charging coil including a first spiral and a second spiral that are defined in a common plane; and
a controller configured to determine whether a specified chargeable wireless device is a Qi-enabled device corresponding to the first charging coil or a near-field-communication-enabled device corresponding to the second charging coil, the controller configured to cause the first charging coil to wirelessly transfer power to the specified chargeable wireless device in response to the specified chargeable wireless device being a Qi-enabled device corresponding to the first charging coil, the controller configured to cause the second charging coil to wirelessly transfer power to the specified chargeable wireless device by simultaneously causing a first current to flow through the first spiral in a first radial direction and a second current to flow through the second spiral in a second radial direction that is opposite the first radial direction to focus flux that is generated by the first current and the second current in a shape of a toroid having first and second cross-sections that intersect the respective first and second spirals at the common plane in response to the specified chargeable wireless device being a near-field-communication-enabled device corresponding to the second charging coil, the controller configurable to cause the first and second charging coils to wirelessly transfer power to a Qi-enabled device and a near-field-communication-enabled device, respectively, simultaneously such that the first charging coil wirelessly transfers power of greater than one watt to the Qi-enabled device simultaneously with the second charging coil wirelessly transferring power of less than one watt to the near-field-communication-enabled device.

* * * * *